United States Patent Office 3,403,147
Patented Sept. 24, 1968

3,403,147
16,17-ACETONIDES OF 20 OXYGENATED PREGN-4-EN-3,16,17-TRIOLS AND PREGNA - 3,5 - DIEN-16,17-DIOLS
Gerald W. Krakower, Elizabeth, and Josef Fried, Princeton, N.J., assignors, by mesne assignments, to E. R. Squibb & Sons, Inc., New York, N.Y., a corporation of Delaware
No Drawing. Filed Apr. 9, 1963, Ser. No. 271,605
2 Claims. (Cl. 260—239.55)

This invention relates to and has as its objects the provision of new physiologically active steroids, methods for preparing the same, and new intermediates useful in said preparation.

The final products of this invention can be represented by the formulae

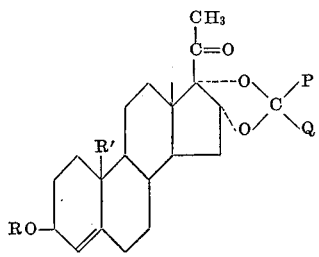

wherein R' represents hydrogen or lower alkyl (e.g., methyl); R represents hydrogen or acyl wherein the acyl is from a hydrocarbon carboxylic acid of less than twelve carbon atoms; P represents hydrogen, lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; Q is lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; or together with the carbon to which they are joined P and Q is a monocyclic cycloalkyl or monocyclic heterocyclic radical.

The final products of this invention are physiologically-active substances which possess progestational activity and hence can be used in lieu of known progestational agents, such as progesterone, in the treatment of habitual abortion. For this purpose, they can be administered in the same manner as progesterone, for example, the dosage being adjusted for the relative potency of the particular steroid. The compounds of this invention can also be administered perorally in the form of tablets.

In the most preferable embodiment of this invention, P is lower alkyl and Q is selected from the group consisting of lower alkyl (e.g., methyl) and monocyclic aryl (e.g., phenyl).

The final products of this invention are prepared according to the novel processes of this invention, which may be represented by the following equations wherein R, R', P and Q are as hereinbefore defined:

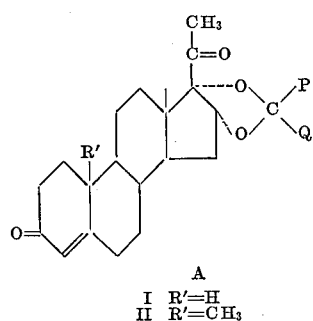
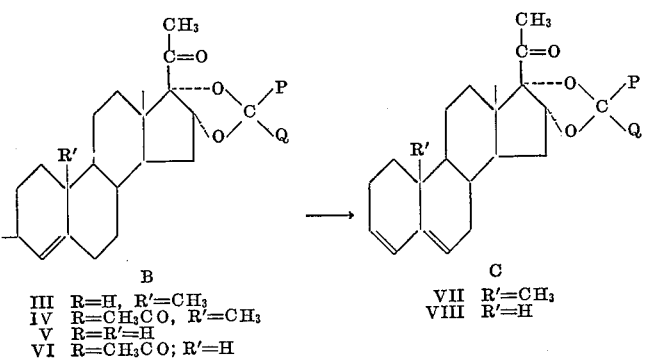

A
I  R'=H
II R'=CH₃

B
III R=H,  R'=CH₃
IV  R=CH₃CO, R'=CH₃
V   R=R'=H
VI  R=CH₃CO; R'=H

C
VII  R'=CH₃
VIII R'=H and

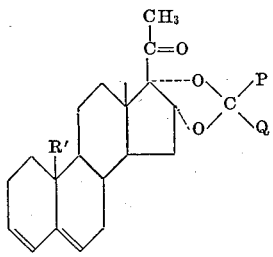

The preferred acyl radicals are those derived from hydrocarbon carboxylic acids of less than twelve carbon atoms, as exemplified by the lower alkanoic acids (e.g., acetic, propionic, butyric and tert.-pentanoic acids), the lower alkenoic acids, the monocyclic aryl carboxylic acids (e.g., benzoic and toluic acids), the monocyclic aryl lower alkanoic acids (e.g., phenacetic and β-phenylpropionic acids) and the cycloalkane carboxylic acids and the cycloalkene carboxylic acids.

In the first step of this novel process, the 16α,17α-acetal or ketal derivatives of 16α,17α-dihydroxyprogesterone and 16α,17α-dihydroxy-19-norprogesterone (Compounds A) obtained as disclosed in U.S. Patent No. 3,048,581 issued Aug. 7, 1962, in the name of Josef Fried, and in copending U.S. applications, Ser. No. 129,234 filed Aug. 4, 1961, in the names of Josef Fried and Mariano Andrew Guiducci, now U.S. Patent No. 3,243,433, and Ser. No. 268,605 filed Mar. 28, 1963, in the name of Patrick A. Diassi, now abandoned, respectively, are first reduced as by treatment with a mixed metal aluminum hydride, for examples, lithium tertiary butoxy aluminum hydride, to yield the 16α,17α-acetal or ketal derivatives of Δ⁴-pregnene-3β,16α,17α-triol-20-one and 19-nor-Δ⁴-pregnene-3β,16α,17α-triol-20-one (Compounds B), which are new products of this invention.

Compounds B (wherein R is hydrogen) may then be acylated, as by treatment with an acylating agent, such as acyl halide or acid anhydride, in a basic medium such as pyridine or collidine, to yield the respective 3-ester derivatives of Compounds B (i.e., wherein R is acyl), which are also new products of this invention.

Alternatively, other 16,17-acetal or ketal derivatives of the starting materials (Compounds A) of this invention may be desired.

If a ketal or acetal grouping other than that present in the starting steroid reactant is desired, the resulting product may be cleaved by treatment with aqueous formic acid to yield 16α,17α-dihydroxy intermediates of the formula

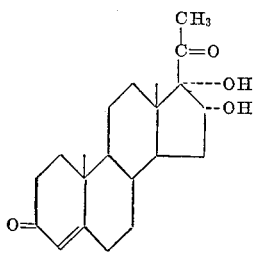

If concentrated aqueous formic acid is used (e.g., 90% formic acid), a 16-formic acid ester is formed, which is then hydrolyzed by treatment with 10% aqueous potassium carbonate in methanol to yield the free 16,17-dihydroxy steroid derivative.

These intermediates are then reacted with an aldehyde or ketone of the formula:

wherein P and Q are as hereinbefore defined. The reaction is preferably carried out by treating a suspension or solution of the dihydroxy steroid in the aldehyde or ketone (or an organic solvent and the aldehyde or ketone, if the aldehyde or ketone is a solid) with an acid catalyst (e.g. perchloric acid, p-toluenesulfonic acid, hydrochloric acid, etc.), neutralizing the acid and recovering the acetal or ketal derivative formed.

Suitable aldehyde and ketone reactants include lower alkanals of at least two carbon atoms, such as paraldehyde, propanal and hexanal; di(lower alkyl)ketones, such as actone, diethylketone, dibutylketone, methylethylketone, and methylisobutylketone; cycloalkanones, such as cyclobutanone, cyclopentanone, cyclohexanone, suberone, and cyclodexanone; cycloalkyl (lower alkanals), such as cyclopropylcarboxaldehyde, cyclobutylcarboxyaldehyde, cyclopentylcarboxaldehyde, cyclohexylcarboxaldehyde, cycloheptylcarboxaldehyde, cyclooctylcarboxaldehyde, cyclopropylacetaldehyde, cyclobutylacetaldehyde, cyclopentylacetaldehyde, cyclohexylacetaldehyde, β-cyclopentylpropionaldehyde, γ-cyclohexylbutyraldehyde, and 3-cyclopropylcaproaldehyde; cycloalkyl(lower alkanones), such as cyclopropyl methyl ketone, cyclobutyl ethyl ketone, cyclopentyl propyl ketone, cyclopentylmethyl methyl ketone, cyclohexylmethyl ethyl ketone, cyclopentylethyl ethyl ketone, cyclopropylpropyl methyl ketone, cyclohexyl n-penyl ketone, cyclohexyl methyl ketone, and cyclooctyl methyl ketone; dicycloalkyl ketones, such as dicyclopropyl ketone, dicyclobutyl ketone, dicyclopentyl ketone, dicyclohexyl ketone, cyclopentyl cyclohexyl ketone, cyclo- propylmethyl cyclopropyl ketone, 2-cyclobutylethyl cyclopropyl ketone, 3-cyclopentylmethyl cyclopentyl ketone, 5-cyclohexylhexyl cyclohexyl ketone, di(cyclopentylmethyl) ketone, cyclohexylmethyl cyclopentyl ketone, and di(4-cyclohexylpentyl) ketone; cycloalkyl monocyclic aromatic ketones, such as cyclopropyl phenyl ketone, cyclohexyl p-chlorophenyl ketone, cyclopentyl o-methoxyphenyl ketone, cyclopentyl, o,p-dihydroxyphenyl ketone, cyclohexyl m-tolyl ketone, cyclopropyl p-ethylphenyl ketone, cyclopropyl p-nitrophenyl ketone, and cyclohexyl p-acetamidophenyl ketone; cycloalkyl(lower alkyl) monocyclic aromatic ketones, such as cyclopentylmethyl phenyl ketone; cycloalkyl monocyclic aromatic (lower alkyl) ketones, such as cyclopentyl benzyl ketone, cyclohexyl phenethyl ketone, and cyclobutyl benzyl ketone; cycloalkyl (lower alkyl) monocyclic aromatic (lower alkyl) ketones, such as cyclopentylmethyl benzyl ketones; cycloalkyl monocyclic heterocyclic ketones, such as cyclopentyl 2-furyl ketone, cyclohexyl 2-thienyl ketone, and cyclopropyl 2-pyridinyl ketone; cycloalkyl (lower alkyl) monocyclic heterocyclic ketones, such as cyclopentylmethyl 2-piperidinyl ketone, cyclohexylethyl 2-morpholinyl ketone and cyclopropyl 2-thienyl ketone; cycloalkyl monocyclic heterocyclic (lower alkyl) ketones, such as cyclopentyl thenyl ketone, cyclohexyl furfuryl ketone and cyclopropyl 2-piperidinylmethyl ketone; halo-lower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carbocyclic aromatic aldehydes such as benzaldehyde, halobenzaldehydes (e.g. p-chlorobenzaldehyde and p-fluorobenzaldehyde), lower alkoxybenzaldehydes (e.g. o-anisaldehyde), di(lower alkoxy)benzaldehydes (e.g. veratraldehyde), hydroxybenzaldehydes (e.g., salicylaldehyde), dihydroxybenzaldehydes (e.g. resorcyaldehyde), lower alkyl benzaldehydes (e.g. m-tolualdehyde and p-ethylbenzaldehyde), di(lower alkyl)benzaldehydes (e.g. o,p-dimethylbenzaldehyde), nitrobenzaldehydes, acylamidobenzaldehydes (e.g. N-acetylanthranilaldehyde), and cyanobenzaldehydes; monocyclic carboxylic aromatic lower alkanals, such as phenylacetaldehyde, α-phenylpropionaldehyde, β-phenylpropionaldehyde, γ-phenylbutyraldehyde, and aromatically-substituted halo lower alkoxy, hydroxy, lower alkyl, nitro, acylamido and cyano derivatives thereof; monocyclic heterocyclic aldehydes, such as picolinaldehydes, furfural, thiophene carbonals, and halo, lower alkoxy, hydroxy, lower alkyl, nitro, and cyano derivatives, thereof; monocyclic heterocyclic lower alkanals; monocyclic carbocyclic aromatic ketones, such as acetophenone, α,α,α-trifluoroacetophenone, propiophenone, butyrophenone, valerophenone, isocaprophenone halophenyl lower alkyl ketones (e.g. p-chloroacetophenone and p-chloropropionphenone), (lower alkoxy) phenyl lower alkyl ketones (e.g. p-anisyl methyl ketone), di(lower alkoxy)phenyl lower alkyl ketones, hydroxyphenyl lower alkyl ketones, dihydroxyphenyl lower alkyl ketones (e.g. resacetophenone), (lower alkyl)phenyl lower alkyl ketones (e.g. methyl p-tolyl ketone), di(lower alkyl)phenyl lower alkyl ketones (o,p-xylyl methyl ketone), nitrophenyl lower alkyl ketones (e.g. p-nitroacetophenone), acylamidophenyl lower alkyl ketones (e.g. acetyl anilines), and cyanophenyl lower alkyl ketones; benzophenone, and mono or bis substituted halo, lower alkoxy, hydroxy, lower alkyl, nitro, acylamido and cyano derivatives thereof; monocyclic carbocylic aromatic lower alkanones, such as 1-phenyl-3-butanone and 1-phenyl-4-pentanone, and aromatically substituted derivatives thereof; monocyclic heterocyclic ketones, such as 2-acetylfuran, 2-benzoylfuran, 2-acetyl-thiophene and alloxan; and monocyclic heterocyclic lower alkanones.

Compounds B are then dehydrated, as by treatment with acetic acid, to yield the 16α,17α-acetal or ketal derivatives of Δ³,⁵-pregnadiene-16α,17α-diol-20-one and 19-nor-Δ³,⁵⁽⁶⁾-pregnadiene-16α,17α-diol-20-one (Compounds C), which are the new final products of this invention.

Alternatively, the final products of this invention may be prepared by the process set forth by the following equations wherein R, R', P and Q are as hereinbefore defined:

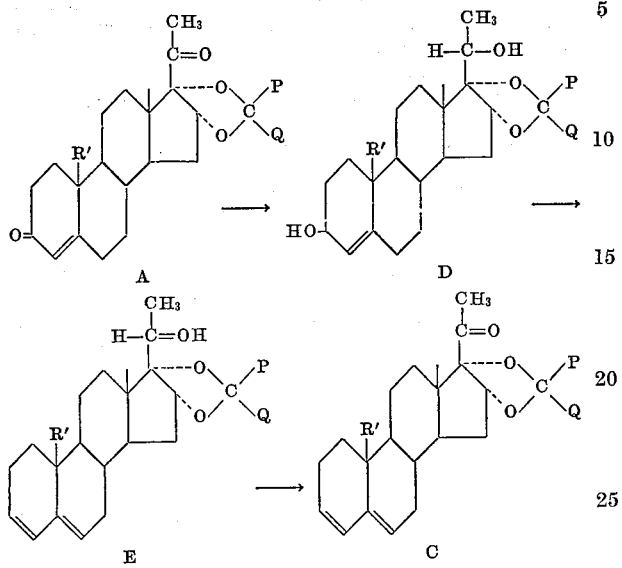

In this alternate process, Compounds A are reduced as by treatment with lithium borohydride to yield the 3,20-diol derivatives thereof (Compounds D) which are also new compounds of this invention. Compounds D may then be dehydrated as by treatment with acetic acid to yield the $\Delta^{3,5}$-pregnadiene-20-ol derivatives (Compounds E) which are also new compounds of this invention. Compounds E are then oxidized as by treatment with an oxidizing agent, such as chromic acid, to yield the $\Delta^{3,5}$-pregnadiene products of this invention (Compounds C).

The invention may be further illustrated by the following examples wherein the temperatures are in degrees centigrade, unless otherwise noted.

Example 1.—$\Delta^4$-pregnene-3$\beta$,16$\alpha$,17$\alpha$-triol-20-one 16,17-acetonide (III)

A solution of 768 mg. of $\Delta^4$-pregnene-16$\alpha$,17$\alpha$-diol-3,20-dione 16,17-acetonide (II) (2 mmoles) and 1.020 g. of lithium tri-tert.-butoxyaluminum hydride (4-mmoles) in 60 ml. of freshly distilled tetrahydrofuran is refluxed for 90 minutes. The solution is then cooled, water is added and the organic solvent is evaprated. The resulting suspension is extracted with chloroform and the chloroform is washed with water, 5% hydrochloric acid and water, dried over magnesium sulfate and evaporated. Recrystallization of the product from acetone gives 494 mg. of $\Delta^4$-pregnene-3$\beta$,16$\alpha$,17$\alpha$-triol-20-one 16,17- acetonide (III), M.P. 167–169° C. [$\alpha$]$_D$ +81°. After drying overnight at 125° C. under high vacuum, the melting point is raised to 174–175° C. There is no selective absorption in the ultraviolet spectrum. The infrared spectrum has a hydroxyl band at 3.0$\mu$ and a saturated ketone band at 5.84$\mu$.

Analysis.—Calcd. for $C_{24}H_{36}O_4$: C, 74.19; H, 9.34. Found: C, 74.04; H, 9.32.

Example 2.—19-nor-$\Delta^4$-pregnene-3$\beta$,16$\alpha$,17$\alpha$-triol-20-one-16,17-acetonide (V)

Following the procedure set forth in Example 1, but substituting an equivalent amount of 19-nor-$\Delta^4$-pregnene-16$\alpha$,17$\alpha$-diol-3,20-dione 16,17-acetonide (I) for $\Delta^4$-pregnene-16$\alpha$,17$\alpha$-diol-3,20-dione 16,17-acetonide (II) yields 19 - nor - $\Delta^4$-pregnene-3$\beta$,16$\alpha$,17$\alpha$-triol-20-one 16,17-acetonide (V), M.P. 134–137° C.

Example 3.—19-nor-$\Delta^4$-pregnene-3$\beta$,16$\alpha$,17$\alpha$-triol-20-one 16,17-acetophenonide (V)

Following the procedure set forth in Example 1, but substituting an equivalent amount of 19-nor-$\Delta^4$-pregnene-16$\alpha$,17$\alpha$-diol-3,20-dione 16,17-acetophenonide for $\Delta^4$-pregnene-16$\alpha$,17$\alpha$-diol-3,20-dione 16,17-acetonide (II) yields 19-nor-$\Delta^4$-pregnene-3$\beta$,16$\alpha$,17$\alpha$-triol-20-one 16,17-acetophenonide (V).

Example 4.—$\Delta^4$-pregnene-3$\beta$,16$\alpha$,17$\alpha$-triol-20-one 16,17-acetophenonide (III)

Following the procedure set forth in Example 1 but substituting an equivalent amount of $\Delta^4$-pregnene-16$\alpha$,17$\alpha$-diol-3,20-dione 16,17-acetophenonide (II) for $\Delta^4$-pregnene - 16$\alpha$,17$\alpha$ - diol-3,20-dione 16,17-acetonide (II) yields $\Delta^4$-pregnene-3$\beta$,16$\alpha$,17$\alpha$-triol-20-one 16,17-acetophenonide (III).

Example 5.—$\Delta^4$-pregnene-3$\beta$,16$\alpha$,17$\alpha$-triol-20-one 16,17-acetylfuran (III)

Following the procedure set forth in Example 1 but substituting an equivalent amount of $\Delta^4$-pregnene-16$\alpha$,17$\alpha$-diol-3,20-dione 16,17-acetylfuran for $\Delta^4$-pregnene-16$\alpha$,17$\alpha$-diol-3,20-dione 16,17-acetonide yields $\Delta^4$-pregnene-3$\beta$,16$\alpha$,17$\alpha$-triol-20-one 16,17-acetylfuran (III).

Example 6.—$\Delta^4$-pregnene-3$\beta$,16$\alpha$,17$\alpha$-triol-20-one 3-acetate 16,17-acetonide (IV)

$\Delta^4$ - pregnene-3$\beta$,16$\alpha$,17$\alpha$-triol-20-one 16,17-acetonide (III), 100 mg., is dissolved in 2 ml. of pyridine containing 1 ml. of acetic anhydride and left overnight at room temperature. The reaction mixture is decomposed with water and evaporated to dryness under vacuum. Recrystallization from methanol gives 54 mg. of $\Delta^4$-pregnene-3$\beta$,16$\alpha$,17$\alpha$-triol-20-one 3-acetate 16,17-acetonide (IV), M.P. 191.5–192.5° C., [$\alpha$]$_D$ +43°. The analytical sample has M.P. 192–193° C.

Analysis.—Calcd. for $C_{26}H_{38}O_5$: C, 72.52; H, 8.90. Found: C, 72.69; H, 9.13.

Example 7.—19-nor-$\Delta^4$-pregnene-3$\beta$,16$\alpha$,17$\alpha$-triol-20-one 3-acetate 16,17-acetonide (VI)

Following the procedure set forth in Example 6, but substituting an equivalent amount of 19-nor-$\Delta^4$-pregnene-3$\beta$,16$\alpha$,17$\alpha$-triol-20-one 16,17-acetonide (V) for $\Delta^4$-pregnene-3$\beta$,16$\alpha$,17$\alpha$-triol-20-one 16,17-acetonide (III) yields 19-nor-$\Delta^4$-pregnene-3$\beta$,16$\alpha$,17$\alpha$-triol-20-one 3-acetate 16,17-acetonide (VI), M.P. 170–172° C.

Example 8.—$\Delta^4$-pregnene-3$\beta$,16$\alpha$,17$\alpha$-triol-20-one 3-acetate 16,17-acetophenonide (IV)

Following the procedure set forth in Example 6 but substituting an equivalent amount of $\Delta^4$-pregnene-3$\beta$,16$\alpha$,17$\alpha$-triol-20-one 16,17-acetophenonide (III) for $\Delta^4$-pregnene-3$\beta$,16$\alpha$,17$\alpha$-triol-20-one 16,17-acetonide yields $\Delta^4$-pregnene-3$\beta$,16$\alpha$,17$\alpha$-triol-20-one 3-acetate 16,17-acetophenonide (IV).

Example 9.—19-nor-$\Delta^4$-pregnene-3$\beta$,16$\alpha$,17$\alpha$-triol-20-one 3-acetate 16,17-acetophenonide (VI)

Following the procedure set forth in Example 6 but substituting an equivalent amount of 19-nor-$\Delta^4$-pregnene-3$\beta$,16$\alpha$,17$\alpha$-triol-20-one 16,17-acetophenonide (V) for $\Delta^4$ - pregnene - 3$\beta$,16$\alpha$,17$\alpha$ - triol-20-one 16,17-acetonide yields 19-nor-$\Delta^4$-pregnene-3$\beta$,16$\alpha$,17$\alpha$-triol-20-one 3-acetate 16,17-acetophenonide (VI).

Example 10.—$\Delta^{3,5}$-pregnadiene-16$\alpha$,17$\alpha$-diol-20-one 16,17-acetonide (VII)

A solution of 502 mg. of $\Delta^4$-pregnene-3$\beta$,16$\alpha$,17$\alpha$-triol-20-one 16,17-acetonide (III) in 132 ml. of 50% aqueous acetic acid is refluxed under helium for 4 hours. The mixture is then evaporated to dryness under vacuum to give 483 mg. of crude material. After chromatography on neutral alumina and elution with benzene-chloroform (4:1) 71 mg. of material is obtained. On recrystallization from ethanol this gives 28 mg. of a first crop, M.P. 141–143° C. and a second crop of 28 mg., M.P. 138–140° C. The analytical sample has M.P. 142–143° C.

[α]$_D$ —80°. The ultraviolet spectrum has a triple peak at $\lambda^{EtOH}$ 226 mμ (flat), 236 mμ and 244 mμ (flat), ε=17,800, 19,500 and 13,700 respectively.

*Analysis.*—Calcd. for $C_{24}H_{34}O_3$: C, 77.80; H, 9.25. Found: C, 77.77; H, 9.23.

Example 11.—19-nor-$\Delta^{3,5(6)}$-pregnadiene-16α,17α-diol-20-one 16,17-acetonide (VIII)

Following the procedure set forth in Example 10 but substituting an equivalent amount of 19-nor-$\Delta^4$-pregnene-3β,16α,17α-triol-20-one 16,17-acetonide for $\Delta^4$-pregnene-3β,16α,17α-triol-20-one 16,17-acetonide yields 19-nor-$\Delta^{3,5(6)}$ - pregnadiene-16α,17α-diol-20-one 16,17-acetonide (VIII).

Example 12.—$\Delta^{3,5}$-pregnadiene-16α,17α-diol-20-one 16,17-acetophenonide (VII)

Following the procedure set forth in Example 10 but substituting an equivalent amount of $\Delta^4$-pregnene-3β,16α,17α-triol-20-one 16,17-acetophenonide for $\Delta^4$-pregnene-3β,16α,17α-triol-20-one 16,17-acetophenonide yields $\Delta^{3,5}$-pregnadiene - 16α,17α - diol - 20-one 16,17-acetophenonide (VII).

Example 13.—19-nor-$\Delta^{3,5(6)}$-pregnadiene-16α,17α-diol-20-one 16,17-acetophenonide (VIII)

Following the procedure set forth in Example 10 but substituting an equivalent amount of 19-nor-$\Delta^4$-pregnene-3β,16α,17α-triol-20-one 16,17-acetophenonide for $\Delta^4$-pregnene-3β,16α,17α-triol-20-one 16,17-acetonide yields 19-nor-$\Delta^{3,5(6)}$-pregnadiene-16α,17α-diol-20-one 16,17-acetophenonide (VIII).

Example 14.—$\Delta^4$-pregnene-3,16α,17α,20-tetrol 16,17-acetophenonide

A solution of 1.0 g. of $\Delta^4$-pregnene-16α,17α-diol-3,20-dione 16,17-acetophenonide and 2.0 g. of lithium borohydride in 50 ml. of freshly distilled tetrahydrofuran is refluxed for 2 hours. The solution is diluted with water and the organic solvent evaporated. The aqueous suspension is extracted with chloroform, washed with water, 5% hydrochloric acid and water, dried and evaporated to give 1.0 g. of product. Recrystallization from cyclohexane gives 827 mg. of a mixture of epimeric alcohols, M.P. 102–112° C. which on recrystallization gives M.P. 105–128° C. The infrared spectrum shows no absorption in the carbonyl region.

*Analysis.*—Calcd. for $C_{29}H_{40}O_4$: C, 76.95; H, 8.91. Found: C, 77.16; H, 9.15.

Example 15.—19-nor-$\Delta^4$-pregnene-3,16α,17α,20-tetrol-16,17-acetophenonide

Following the procedure set forth in Example 14 but substituting an equivalent amount of 19-nor-$\Delta^4$-pregnene-16α,17α-diol-3,20-dione 16,17-acetophenonide for $\Delta^4$-pregnene-16α,17α-diol-3,20-dione 16,17-acetophenonide yields 19-nor-$\Delta^4$-3,16α,17α,20-tetrol-16,17-acetophenonide.

Example 16.—$\Delta^4$-pregnene-3,16α,17α,20-tetrol 16,17-acetonide

Following the procedure set forth in Example 14 but substituting an equivalent amount of $\Delta^4$-pregnene-16α,17α-diol-3,20-dione 16,17-acetonide for $\Delta^4$-pregnene-16α,17α-diol-3,20-dione 16,17-acetophenonide yields $\Delta^4$-pregnene-3,16α,17α-20-tetrol 16,17-acetonide.

Example 17.—19-nor-$\Delta^4$-pregnene-3,16α,17α,20-tetrol 16,17-acetonide

Following the procedure set forth in Example 14 but substituting an equivalent amount of 19-nor-$\Delta^4$-pregnene-16α,17α-diol-3,20-dione 16,17-acetonide for $\Delta^4$-pregnene-16α,17α-diol-3,20-dione 16,17-acetonide yields 19-nor-$\Delta^4$-pregnene-3,16α,17α,20-tetrol 16,17-acetonide.

Example 18.—$\Delta^{3,5}$-pregnadiene-16α,17α,20-triol 16,17-acetophenonide

A solution of 624 mg. of $\Delta^4$-pregnene-3,16α,17α,20-tetrol 16,17-acetophenonide in 100 ml. of 50% aqueous acetic acid is refluxed for one hour under helium. The solvent is evaporated and the resulting product is purified by thin layer chromatography on alumina to give 117 mg. of amorphous $\Delta^{3,5}$-pregnadiene-16α,17α,20-triol 16,17-acetophenonide, $\lambda^{EtOH}$ 228 mμ, 234 mμ, 244 mμ; ε=19,600, 21,000 and 13,000 respectively.

Example 19.—19-nor-$\Delta^{3,5}$-pregnadiene-16α,17α,20-triol 16,17-acetophenonide Following the procedure set forth in Example 18 but substituting an equivalent amount of 19-nor-$\Delta^4$-pregnene-3,16α,17α,20-tetrol 16,17-acetophenonide for $\Delta^4$-pregnene-3,16α,17α,20-tetrol 16,17-acetophenonide yields 19-nor-$\Delta^{3,5}$-pregnadiene-16α,17α,20-triol 16,17-acetophenonide.

Example 20.—19-nor-$\Delta^{3,5}$-pregnadiene-16α,17α,20-triol 16,17-acetonide

Following the procedure set forth in Example 18 but substituting an equivalent amount of 19-nor-$\Delta^4$-pregnene-3,16α,17α,20-tetrol 16,17-acetonide for $\Delta^4$-pregnene-3,16α,17α,20-tetrol 16,17-acetophenonide yields 19-nor-$\Delta^{3,5}$-pregnadiene-16α,17α,20-triol 16,17-acetonide.

Example 21.—$\Delta^{3,5}$-pregnadiene-16α,17α,20-triol 16,17-acetonide

Following the procedure set forth in Example 18 but substituting an equivalent amount of $\Delta^4$-pregnene-3,16α,17α,20-tetrol 16,17-acetonide for $\Delta^4$-pregnene-3,16α,17α,20 - tetrol - 16α,17α - acetonide yields $\Delta^{3,5}$-pregnadiene-16α,17α,20-triol 16,17-acetonide.

Example 22.—$\Delta^{3,5}$-pregnadiene-16α,17α-diol-20-one 16,17-actophenonide

A solution of 110 mg. of $\Delta^{3,5}$-pregnadiene-16α,17α,20-triol 16,17-acetophenonide in 15 ml. of acetone is oxidized by the dropwise addition of a slight excess of chromic acid-sulfuric acid-acetone reagent. Methanol is then added to decompose the excess oxidizing agent and the acetone is evaporated. The aqueous mixture is extracted with ether and the ether solution washed with water, dried and evaporated. Purification of the crude product by thin layer chromatography on alumina gives $\Delta^{3,5}$-pregnadiene-16α,17α-diol-20-one 16,17-acetophenonide, M.P. 167–170° C., $\lambda^{EtOH}$ 229 mμ, 236 mμ, 244 mμ; ε=21,300, 23,200 and 14,800 respectively; $\lambda^{KBr}$ 5.85μ.

Example 23.—19-nor-$\Delta^{3,5}$-pregnadiene-16α,17α-diol-20-one 16,17-acetophenonide Following the procedure set forth in Example 22 but substituting an equivalent amount of 19-nor-$\Delta^{3,5}$-pregnadiene-16α,17α,20-triol 16,17-acetophenonide for $\Delta^{3,5}$-pregnadiene-16α,17α,20-triol 16,17-acetophenonide yields 19-nor-$\Delta^{3,5}$-pregnadiene-16α,17α-diol-20-one 16,17-acetophenonide.

Example 24.—$\Delta^{3,5}$-pregnadiene-16α,17α-diol-20-one 16,17-acetonide

Following the procedure set forth in Example 22 but substituting an equivalent amount of $\Delta^{3,5}$-pregnadiene-16α,17α,20-triol 16,17-acetophenonide for $\Delta^{3,5}$-pregnadiene-16α,17α,20-triol 16,17-acetophenonide yields $\Delta^{3,5}$-pregnadiene-16α,17α-diol-20-one 16,17-acetonide.

Example 25.—19-nor-$\Delta^{3,5}$-pregnadiene-16α,17α-diol-20-one 16,17-acetonide Following the procedure set forth in Example 22, but substituting an equivalent amount of 19-nor-$\Delta^{3,5}$-pregnadiene-16α,17α,20-triol 16,17-acetonide for $\Delta^{3,5}$-pregnadiene-16α,17α,20-triol 16,17-acetophenonide yields 19-nor-$\Delta^{3,5}$-pregnadiene-16α,17α-diol-20-one 16,17-acetonide Similarly, the other 16,17-acetal or ketal derivatives of these compounds, which may be obtained in accordance with the disclosures set forth in U.S. Patent 3,077,471, issued Feb. 12, 1963, and copending U.S. application Ser. No. 129,234, filed Aug. 4, 1961, in the names of Josef Fried and Mariano Andrew Guiducci, may be treated in accordance with the hereinabove presented examples to yield the respective 16,17-acetal or ketal derivatives of the compounds of this invention.

This invention may be variously otherwise embodied within the scope of the appended invention.

What is claimed is:

1. A compound selected from the group consisting of steroids of the formula:

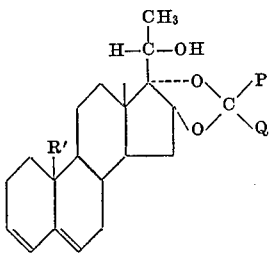

wherein R' is hydrogen or methyl; P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; and together with the carbon to which they are joined P and Q is selected from the group consisting of monocyclic cycloalkyl and monocyclic heterocyclic.

2. $\Delta^{3,5}$ - pregnadiene - $16\alpha,17\alpha,20$ - triol 16,17 - acetophenonide.

References Cited

UNITED STATES PATENTS

| | | | |
|---|---|---|---|
| 3,076,803 | 2/1963 | Zderic et al. | 260—239.55 |
| 3,099,655 | 7/1963 | Zderic et al. | 260—239.55 |
| 3,134,770 | 5/1964 | Fried | 260—239.55 |

LEWIS GOTTS, *Primary Examiner.*

T. M. MESHBESHER, *Assistant Examiner.*